United States Patent
Ren et al.

(10) Patent No.: US 10,986,670 B2
(45) Date of Patent: Apr. 20, 2021

(54) RANDOM ACCESS FEEDBACK METHOD, RANDOM ACCESS PROCESSING METHOD, BASE STATION AND TERMINAL

(71) Applicant: CHINA ACADEMY OF TELECOMMUNICATIONS TECHNOLOGY, Beijing (CN)

(72) Inventors: Bin Ren, Beijing (CN); Tony Ekpenyong, Beijing (CN); Xueming Pan, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/476,046

(22) PCT Filed: Feb. 7, 2018

(86) PCT No.: PCT/CN2018/075576
§ 371 (c)(1),
(2) Date: Jul. 3, 2019

(87) PCT Pub. No.: WO2018/127228
PCT Pub. Date: Jul. 12, 2018

(65) Prior Publication Data
US 2019/0357266 A1   Nov. 21, 2019

(30) Foreign Application Priority Data
Jan. 6, 2017 (CN) .......................... 201710012053.9

(51) Int. Cl.
*H04W 74/08* (2009.01)
*H04W 72/12* (2009.01)
(Continued)

(52) U.S. Cl.
CPC ... *H04W 74/0833* (2013.01); *H04W 72/1263* (2013.01); *H04W 72/14* (2013.01); *H04W 80/02* (2013.01)

(58) Field of Classification Search
CPC .............. H04W 24/08; H04W 52/146; H04W 72/1284; H04W 8/005; H04L 5/0048; H04L 5/001
See application file for complete search history.

(56) References Cited

U.S. PATENT DOCUMENTS

| | | | |
|---|---|---|---|
| 2015/0208386 A1* | 7/2015 | Yang | H04L 1/1861 370/329 |
| 2015/0289292 A1 | 10/2015 | Sun et al. | |
| 2018/0152907 A1* | 5/2018 | Zhang | H04W 74/006 |

FOREIGN PATENT DOCUMENTS

| CN | 104581983 A | 4/2015 |
|---|---|---|
| CN | 104981022 A | 10/2015 |

OTHER PUBLICATIONS

First Office Action from CN app. No. 201710012053.9, dated Dec. 26, 2018, with English translation from Global Dossier.
(Continued)

*Primary Examiner* — Iqbal Zaidi
(74) *Attorney, Agent, or Firm* — Ladas & Parry, LLP (57) ABSTRACT

A random access feedback method, a random access processing method, a base station and a terminal are provided. The random access feedback method includes: receiving a first message sent by a terminal in performing a random access, wherein the first message comprises a preamble field and a data field; detecting the preamble field and the data field of the first message to obtain a detection result of whether or not a preamble exists in the first message and/or whether or not data is successfully obtained in the first message; and feeding back the detection result to the terminal.

20 Claims, 3 Drawing Sheets

(51) Int. Cl.
*H04W 72/14* (2009.01)
*H04W 80/02* (2009.01)

(56) References Cited

OTHER PUBLICATIONS

Written Opinion of the International Searching Authority and International Search Report from PCT/CN2018/075576, dated Apr. 28, 2018, with English translation from WIPO.
International Preliminary Report on Patentability from PCT/CN2018/075576, dated Jul. 9, 2019, with English translation from WIPO.
"Considerations on 2-step RACH physical channel design", R1-1612142, 3GPP TSG RAN WG1 Meeting #87, Reno, USA, Nov. 14-16, 2016.
"Random Access Procedure", R1-1612311, 3GPP TSG-RAN WG1 #87, Reno, USA, Nov. 14-18, 2016.
"Random Access enhancements", R2-168665, 3GPP TSG-RAN WG2 #96, Reno, Nevada, USA, Nov. 14-18, 2016.

* cited by examiner

RANDOM ACCESS FEEDBACK METHOD, RANDOM ACCESS PROCESSING METHOD, BASE STATION AND TERMINAL

CROSS-REFERENCE TO RELATED APPLICATIONS

This application is the U.S. national phase of PCT/CN2018/075576 filed on Feb. 7, 2018, which claims a priority to Chinese Patent Application No. 201710012053.9 filed in China on Jan. 6, 2017, the entire contents of which are is incorporated herein by reference.

TECHNICAL FIELD

The present disclosure relates to the technical field of communications, and in particular to a random access feedback method, a random access processing method, a base station and a terminal.

BACKGROUND

Figure 1:
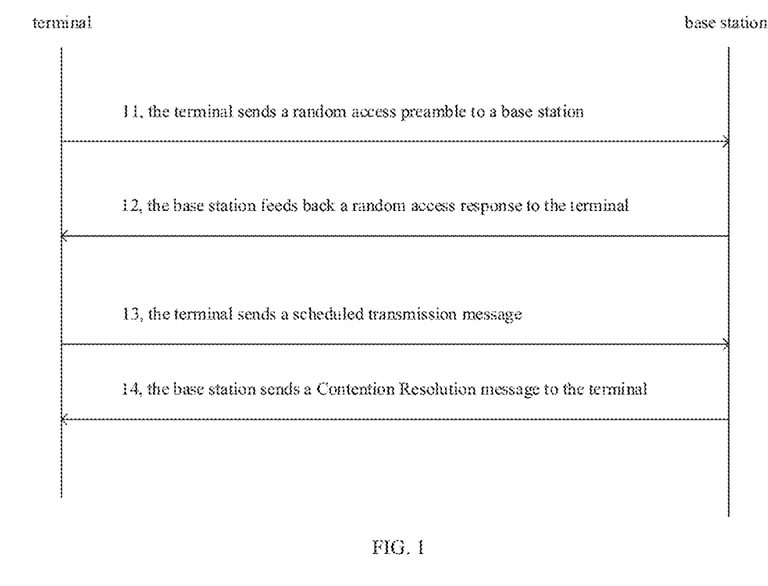
FIG. 1 shows a schematic diagram of a communication process of a four-step random access mechanism.

A four-step random access mechanism is applied in an existing Long Term Evolutionary (LTE) protocol. As shown in FIG. 1, the main implementation process of the four-step random access mechanism is described as follows.

In step 11, a terminal sends a random access preamble (namely an Msg1 message) to a base station;

In step 12, the base station feeds back a random access response (RAR, namely an Msg2 message) to the terminal;

In step 13, the terminal sends a scheduled transmission message (namely an Msg3 message), wherein the Msg3 message includes layer 2/layer 3 (L2/L3) random access information; and In step 14, the base station sends a contention resolution message (namely an Msg4 message) to the terminal.

Figure 2:
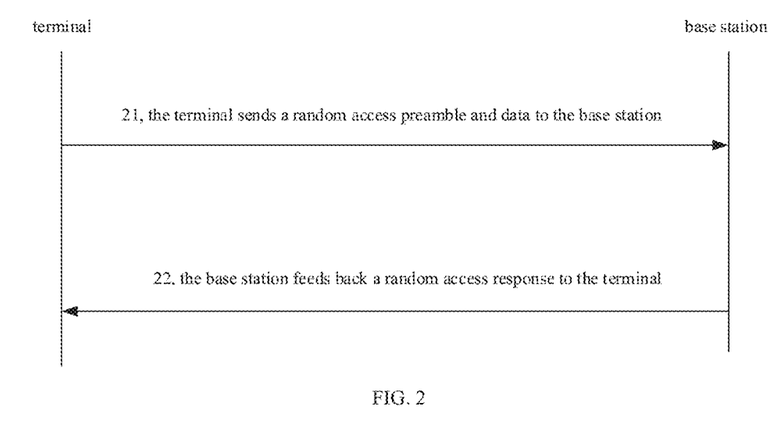
FIG. 2 shows a schematic diagram of a communication process of a two-step random access mechanism.

In the $5^{th}$ generation mobile communication system (5G) New Radio (NR), a problem of large latency in a control plane exists in an uplink multi-beam physical random access channel (PRACH) transmission, and the low latency performance index defined for an Ultra-Reliable and Low Latency Communications (URLLC) scenario cannot be met. In a processing method for effectively reducing the control plane processing latency, a two-step random access mechanism is currently discussed in NR. As shown in FIG. 2, the main implementation process of the two-step random access mechanism is described as follows.

In step 21, the terminal sends a random access preamble and data (Random Access Preamble+Data, namely an Msg1 message) to the base station, wherein the Msg1 message includes identification information of the terminal (namely UE ID), a small data packet, and the like; and In step 22, the base station feeds back a random access response (RAR, namely an Msg2 message) to the terminal.

It should be noted that the difference between the two-step random access mechanism of the NR and the four-step random access mechanism of the conventional LTE is that the Msg1 sends the random access preamble and data simultaneously, and the content of the data bearer corresponds to the content of Msg3 in the four-step random access mechanism.

However, in the current two-step random access mechanism, a method has not been defined in which a terminal can know whether a preamble and data of a first message in the two-step random access mechanism is successfully received by a base station, which results in an incomplete two-step random access mechanism and makes it impossible to ensure the reliability of network communication.

SUMMARY

The technical problem to be solved by the present disclosure is to provide a random access feedback method, a random access processing method, a base station and a terminal, so as to solve the problem in the related art that a terminal cannot know whether a preamble and data of a first message in the two-step random access mechanism is successfully received by a base station, which results in an incomplete two-step random access mechanism and makes it impossible to ensure the reliability of network communication.

In order to solve the above technical problems, an embodiment of the present disclosure provides a random access feedback method, which includes:

receiving a first message sent by a terminal in performing a random access, wherein the first message includes a preamble field and a data field;

detecting the preamble field and the data field of the first message to obtain a detection result of whether or not a preamble exists in the first message and/or whether or not data is successfully obtained in the first message; and feeding back the detection result to the terminal.

Further, the detection result includes at least one of: a preamble existing in the first message, no preamble existing in the first message, data being successfully obtained in the first message, data not being successfully obtained in the first message, a preamble existing in the first message and data not being successfully obtained in the first message, and a preamble existing in the first message and data being successfully obtained in the first message.

Further, in a case that the detection result includes a preamble existing in the first message and data not being successfully obtained in the first message, the step of feeding back the detection result to the terminal includes:

sending a random access response carrying data transmission error information to the terminal: or sending a random access response carrying radio network temporary identification information of the terminal to the terminal, wherein the radio network temporary identification information of the terminal is not equivalent to identification information of the terminal; or feeding back a random access response to the terminal by using a medium access control protocol data unit format of a first random access mechanism; or not sending a random access response to the terminal.

Further, in a case that the detection result includes a preamble existing in the first message and data being successfully obtained in the first message, the step of feeding back the detection result to the terminal includes:

sending a random access response carrying data transmission success information to the terminal; or sending a random access response carrying identification information of the terminal to the terminal, wherein the identification information is detected in the data field of the first message; or feeding back a random access response to the terminal by using a medium access control protocol data unit format of a second random access mechanism, wherein the identification information of the terminal detected in the data field of the first message is carried in the random access response.

Further, in a case that the detection result includes no preamble existing in the first message, the step of feeding back the detection result to the terminal includes:

not sending a random access response to the terminal.

An embodiment of the present disclosure provides a base station, which includes:

a first receiving module, configured to receive a first message sent by a terminal in performing a random access, wherein the first message includes a preamble field and a data field;

a detecting module, configured to detect the preamble field and the data field of the first message to obtain a detection result of whether or not a preamble exists in the first message and/or whether or not data is successfully obtained in the first message; and a feedback module, configured to feed back the detection result to the terminal.

Further, the detection result includes at least one of: a preamble existing in the first message, no preamble existing in the first message, data being successfully obtained in the first message, data not being successfully obtained in the first message, a preamble existing in the first message and data not being successfully obtained in the first message, and a preamble existing in the first message and data being successfully obtained in the first message.

Further, in a case that the detection result includes a preamble existing in the first message and data not being successfully obtained in the first message, the feedback module is configured to:

send a random access response carrying data transmission error information to the terminal; or send a random access response carrying radio network temporary identification information of the terminal to the terminal, wherein the radio network temporary identification information of the terminal is not equivalent to identification information of the terminal; or feed back a random access response to the terminal by using a medium access control protocol data unit format of a first random access mechanism; or not send a random access response to the terminal.

Further, in a case that the detection result includes a preamble existing in the first message and data being successfully obtained in the first message, the feedback module is configured to:

send a random access response carrying data transmission success information to the terminal; or send a random access response carrying identification information of the terminal to the terminal, wherein the identification information is detected in the data field of the first message; or feed back a random access response to the terminal by using a medium access control protocol data unit format of a second random access mechanism, wherein the identification information of the terminal detected in the data field of the first message is carried in the random access response.

Further, in a case that the detection result includes no preamble existing in the first message, the feedback module is configured to:

not send a random access response to the terminal.

An embodiment of the present disclosure provides a random access processing method, which includes:

sending a first message including a preamble field and a data field to a base station, during a random access process;

receiving a detection result for the first message fed back by the base station, wherein the detection result is whether or not a preamble exists in the first message and/or whether or not data is successfully obtained in the first message; and performing random access processing corresponding to the detection result according to the detection result.

Further, the detection result includes at least one of: a preamble existing in the first message, no preamble existing in the first message, data being successfully obtained in the first message, data not being successfully obtained in the first message, a preamble existing in the first message and data not being successfully obtained in the first message, and a preamble existing in the first message and data being successfully obtained in the first message.

Further, in a case that the detection result includes a preamble existing in the first message and data not being successfully obtained in the first message, the step of receiving a detection result for the first message fed back by the base station includes:

receiving a random access response carrying data transmission error information and sent by the base station.

Further, in a case that the detection result includes a preamble existing in the first message and data not being successfully obtained in the first message, the step of receiving a detection result for the first message fed back by the base station includes:

receiving a random access response carrying radio network temporary identification information of the terminal and sent by the base station, wherein the radio network temporary identification information of the terminal is not equivalent to identification information of the terminal, Further, the step of performing random access processing corresponding to the detection result includes:

resending the data that is not successfully sent in the first message to the base station.

Further, in a case that the detection result includes a preamble existing in the first message and data not being successfully obtained in the first message, the step of receiving a detection result for the first message fed back by the base station includes:

receiving a random access response fed back by the base station by using a medium access control protocol data unit format of a first random access mechanism.

Further, the step of performing random access processing corresponding to the detection result includes:

resending the data that is not successfully sent in the first message based on an uplink grant in the random access response.

Further, in a case that the detection result includes a preamble existing in the first message and data being successfully obtained in the first message, the step of receiving a detection result for the first message fed back by the base station includes:

receiving a random access response carrying data transmission success information and sent by the base station; or receiving a random access response carrying identification information of the terminal and sent by the base station, wherein the identification information is detected in the data field of the first message; or receiving a random access response fed back by the base station by using a medium access control protocol data unit format of a second random access mechanism, wherein identification information of the terminal detected in the data field of the first message is carried in the random access response.

Further, the step of performing random access processing corresponding to the detection result includes:

determining that the random access process of the terminal is completed, and performing a subsequent communication process.

Further, in a case that the detection result includes no preamble existing in the first message and/or a preamble existing in the first message and data not being successfully obtained in the first message, the step of receiving a detection result for the first message fed back by the base station includes:

receiving no random access response fed back by the base station within a predetermined time window of random access response.

Further, the step of performing random access processing corresponding to the detection result includes:

Increasing a transmitting power and performing a random access again until a maximum number of transmission is reached.

An embodiment of the present disclosure provides a terminal, which includes:

a sending module, configured to send a first message including a preamble field and a data field to a base station, during a random access process;

a second receiving module, configured to receive a detection result for the first message fed back by the base station, wherein the detection result is whether or not a preamble exists in the first message and/or whether or not data is successfully obtained in the first message; and a processing module, configured to perform random access processing corresponding to the detection result according to the detection result.

Further, the detection result includes at least one of: a preamble existing in the first message, no preamble existing in the first message, data being successfully obtained in the first message, data not being successfully obtained in the first message, a preamble existing in the first message and data not being successfully obtained in the first message, and a preamble existing in the first message and data being successfully obtained in the first message.

Further, in a case that the detection result includes a preamble existing in the first message and data not being successfully obtained in the first message, the second receiving module is configured to:

receive a random access response carrying data transmission error information and sent by the base station.

Further, in a case that the detection result includes a preamble existing in the first message and data not being successfully obtained in the first message, the second receiving module is configured to:

receive a random access response carrying radio network temporary identification information of the terminal and sent by the base station, wherein the radio network temporary identification information of the terminal is not equivalent to identification information of the terminal.

Further, the processing module is configured to:

resend the data that is not successfully sent in the first message to the base station.

Further, in a case that the detection result includes a preamble existing in the first message and data not being successfully obtained in the first message, the second receiving module is configured to:

receive a random access response fed back by the base station by using a medium access control protocol data unit format of a first random access mechanism.

Further, the processing module is configured to:

resend the data that is not successfully sent in the first message based on an uplink grant in the random access response.

Further, in a case that the detection result includes a preamble existing in the first message and data being successfully obtained in the first message, the second receiving module is configured to:

receive a random access response carrying data transmission success information and sent by the base station; or receive a random access response carrying identification information of the terminal and sent by the base station, wherein the identification information is detected in the data field of the first message; or receive a random access response fed back by the base station by using a medium access control protocol data unit format of a second random access mechanism, wherein identification information of the terminal detected in the data field of the first message is carried in the random access response.

Further, the processing module is configured to:

determine that the random access process of the terminal is completed, and perform a subsequent communication process.

Further, in a case that the detection result includes no preamble existing in the first message and/or a preamble existing in the first message and data not being successfully obtained in the first message, the second receiving module is configured to:

receive no random access response fed back by the base station within a predetermined time window of random access response.

Further, the processing module is configured to:

increase a transmitting power and perform a random access again until a maximum number of transmission is reached.

An embodiment of the present disclosure provides a base station, which includes: a processor, a memory, and a transceiver.

The processor is configured to read a program in the memory and perform the following process:

receiving through the transceiver a first message sent by a terminal in performing a random access, wherein the first message includes a preamble field and a data field;

detecting the preamble field and the data field of the first message to obtain a detection result of whether or not a preamble exists in the first message and/or whether or not data is successfully obtained in the first message; and feeding back the detection result to the terminal through the transceiver.

The transceiver is configured to receive and transmit data, and the memory is capable of storing data used by the processor in performing operations.

An embodiment of the present disclosure provides a terminal, which includes: a processor, a memory, and a transceiver.

The processor is configured to read a program in the memory and perform the following process:

sending through the transceiver a first message including a preamble field and a data field to a base station, during a random access process;

receiving through the transceiver a detection result for the first message fed back by the base station, wherein the detection result is whether or not a preamble exists in the first message and/or whether or not data is successfully obtained in the first message; and performing random access processing corresponding to the detection result according to the detection result.

The transceiver is configured to receive and transmit data, and the memory is capable of storing data used by the processor in performing operations.

The present disclosure has the following advantageous effects.

In the foregoing solutions, the base station detects the received first message of the random access of the terminal, and feeds back the detection result to the terminal, so that the terminal can clearly know whether or not the preamble and data of the first message in the two-step random access mechanism is successfully received by the base station n this way, the reliability of network communication is guaranteed.

BRIEF DESCRIPTION OF THE DRAWINGS

The accompanying drawings required to be used in the description of the embodiments are described briefly below, so that the technical solutions according to the embodiments of the present disclosure become clearer. It is apparent that the accompanying drawings in the following description relate to only some embodiments of the present disclosure. For those skilled in the art, other accompanying drawings may be obtained according to these accompanying drawings without any creative effort. The accompanying drawings may not be drawn to scale in line with actual dimensions, with an emphasis laid on showing the spirit of the present disclosure.

DETAILED DESCRIPTION

Hereinafter, the technical solutions in embodiments of the disclosure are described clearly and completely in connection with the accompanying drawings of the embodiments of the present disclosure. It is apparent that the described embodiments are only a part of embodiments of the present disclosure, instead of all of them. Other embodiments obtained by those skilled in the art on the basis of the embodiments of the present disclosure without creative effort will all fall within the scope of protection of the present disclosure.

The present disclosure provides a random access feedback method, a random access processing method, a base station and a terminal, in view of the problem in the related art that a terminal cannot know whether a preamble and data of a first message in the two-step random access mechanism is successfully received by a base station, which results in an incomplete two-step random access mechanism and has an influence on the reliability of network communication.

Figure 3:
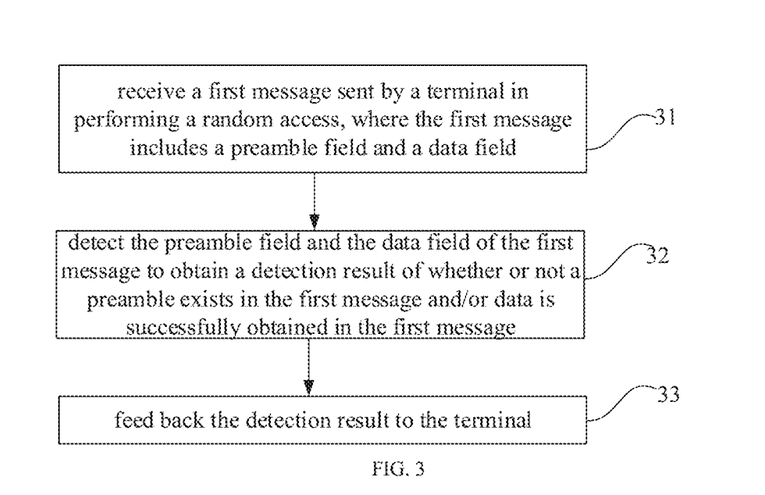
FIG. 3 shows a schematic flowchart of a random access feedback method according to some embodiments of the present disclosure.

As shown in FIG. 3, an embodiment of the present disclosure provides a random access feedback method, which includes the following steps 31 to 33.

In step 31, a first message sent by a terminal in performing a random access is received, wherein the first message includes a preamble field and a data field.

It should be noted that the first message (namely Msg1) is a random access message sent to the base station when the two-step random access mechanism is used by the terminal. Generally, a preamble field and a data field should be reserved in the first message, so that the data information sent by the terminal to the base station and the preamble are filled into the location indicated by a corresponding field, when the terminal performs a random access.

In step 32, the preamble field and the data field of the first message are detected to obtain a detection result of whether or not a preamble exists in the first message and/or whether or not data is successfully obtained in the first message.

It should be noted that, once receiving the random access message sent by the terminal, the base station needs to separately detect the preamble field and the data field in the random access message to determine whether the preamble and the data of the random access are received (it should be noted that generally, the preamble and data sent by the terminal are encoded in different encoding manners). Optionally, the detection result includes at least one of: a preamble existing in the first message, no preamble existing in the first message, data being successfully obtained in the first message, data not being successfully obtained in the first message, a preamble existing in the first message and data not being successfully obtained in the first message, and a preamble existing in the first message and data being successfully obtained in the first message.

In step 33, the detection result is fed back to the terminal.

After the first message sent by the terminal is detected by the base station, the base station needs to notify the terminal of the detection result, so that the terminal performs subsequent random access processing according to the detection result.

The above step 31 will be described below in the following cases respectively: i) the detection result includes a preamble existing in the first message and data not being successfully obtained in the first message; ii) the detection result includes a preamble existing in the first message and data being successfully obtained in the first message, and iii) the detection result includes no preamble existing in the first message.

1. in a case that the detection result includes a preamble existing in the first message and data not being successfully obtained in the first message, the step 33 is implemented as follows.

In a way 11, a random access response carrying data transmission error information is sent to the terminal.

It should be noted that directly carrying the data transmission error information in the random access response is an explicit feedback of the detection result. Once the random access response carrying the data transmission error information is received by the terminal, the terminal may know that base station fails to decode data information. At this point, the terminal needs to resend the data that is not successfully sent in the first message to the base station. In this case, the terminal may continue to transmit a third message (Msg3) in the four-step random access mechanism, place the data that is not successfully sent in the first message in the two-step random access mechanism into the third message, and resend the third message to the base station.

In a way 12, a random access response carrying radio network temporary identification information (Temp C-RNTI, Temporary Cell-RNTI (Radio Network Temporary identifier)) of the terminal is sent to the terminal, wherein the radio network temporary identification information of the terminal is not equivalent to identification information of the terminal (for example, UE ID).

It should be noted that carrying the radio network temporary identification information of the terminal in the random access response is an implicit feedback of the detection result. The terminal may send its own identification information together with the data information to the base station when sending the random access message. Therefore, if the terminal knows that the radio network temporary identification information of the terminal carried in the random access response is not equivalent to the identification information of the terminal itself, it indicates that no data in the random access message is successfully detected by the base station, that is, it indicates that the base station fails to decode data. It should be noted that, if the base station does not decode the data successfully, radio network temporary identification information of the terminal needs to be generated. The radio network temporary identification information may be determined by the base station according to a location of time-frequency resource occupied by the first message. In this situation, the terminal needs to resend the data that is not successfully sent in the first message to the base station. In this case, the terminal may continue to transmit a third message in the four-step random access mechanism, place the data that is not successfully sent in the first message in the two-step random access mechanism into the third message, and resend the third message to the base station.

In a way 13, a random access response is fed back to the terminal by using a medium access control (MAC) protocol data unit (PDU) format of a first random access mechanism.

It should be noted that this way is also an implicit feedback of the detection result. The first random access mechanism refers to the four-step random access mechanism. If the base station feeds back a random access response by using the MAC PDU format of the four-step random access mechanism, it indicates that the base station fails to decode data. In this case, the terminal retransmits the data that is not successfully sent in the first message, based on an uplink grant (UL Grant) in the random access response. Moreover, the modulation and coding scheme (MCS) and the time-frequency resource location used by the terminal in performing retransmission are determined based on the uplink grant.

In a way 14, no random access response is sent to the terminal.

In the way 14, since no data in the first message is detected by the base station, there can be no feedback of the random access response. If no random access response fed back by the base station is received by the terminal within a time window of random access response, the terminal may know that the random access is not successful. In this case, the terminal needs to increase the transmitting power and perform a random access again until a maximum number of transmission is reached. Then, the four-step random access mechanism or the two-step random access mechanism may be used for a random access process.

2. In a case that the detection result includes a preamble existing in the first message and data being successfully obtained in the first message, the step 33 is implemented as follows.

In a way 21, a random access response carrying data transmission success information is sent to the terminal.

It should be noted that directly carrying the data transmission success information in the random access response is an explicit feedback of the detection result. Once the random access response carrying the data transmission success information is received by the terminal, the terminal may know that the base station decodes data information successfully, that is, the random access succeeds. In this case, the terminal determines that the random access process is completed, and performs a subsequent communication process.

In a way 22, a random access response carrying identification information of the terminal is sent to the terminal, wherein the identification information is detected in the data field of the first message.

It should be noted that carrying the identification information of the terminal in the random access response is an implicit feedback of the detection result. The terminal may send its own identification information together with the data information to the base station when sending the random access message. Therefore, if the terminal knows that the identification information of the terminal carried in the random access response is not equivalent to the identification information of the terminal itself, it indicates that the data in the random access message is successfully detected by the base station, that is, it indicates that the base station decodes the data successfully; in other words, the random access succeeds. In this case, the terminal determines that the random access process is completed, and performs a subsequent communication process.

In a way 23, a random access response is fed back to the terminal by using a medium access control protocol data unit format of a second random access mechanism, wherein the identification information of the terminal detected in the data field of the first message is carried in the random access response.

It should be noted that this way 23 is also an implicit feedback of the detection result. The second random access mechanism refers to the two-step random access mechanism. If the base station feeds back a random access response by using the MAC PDU format of the two-step random access mechanism, it indicates that the base station decodes the data successfully, in other words, the random access succeeds. In this case, the terminal determines that the random access process is completed, and performs a subsequent communication process.

3. In a case that the detection result includes no preamble existing in the first message, the step 33 is implemented as follows:

no random access response is sent to the terminal.

In this implementation, since no data in the first message is detected by the base station, the base station may not feed back the random access response. If no random access response fed back by the base station is received by the terminal within a time window of random access response, the terminal may know that the random access is not successful. In this case, the terminal needs to increase the transmitting power and perform a random access again until a maximum number of transmission is reached. Then, the four-step random access mechanism or the two-step random access mechanism may be used for a random access process.

It should be noted that, two ways of feeding back the detection result are mainly provided in the embodiments of the present disclosure, namely an explicit indication way and an implicit indication way.

The explicit indication way refers to feeding back the detection result by using a pre-defined bit field in the random access response, namely the way 11 and the way 12 described above. The implicit indication way includes two cases. One is to design a unified MAC PDU format of random access response for the two-step random access mechanism and the four-step random access mechanism. In this format, it is determined by the terminal whether the value of the field is the same as the identification information of the terminal itself to obtain a feedback result of whether or not the data is successfully detected by the base station, namely the way 12 and the way 22 described above. The other is to design different MAC PDU formats of random access response for the two-step random access mechanism and the four-step random access mechanism, and distinguish the two random access mechanisms through different MAC PDU formats to determine whether the base station successfully decodes the data, namely the way 13 and the way 23 described above.

The above implementation ways of the embodiments of the present disclosure in practical applications are exemplified below.

a. In a case that a preamble is detected by the base station and no data is successfully obtained by the base station, the explicit way is used to feed back the detection result.

In a case that a preamble is detected by the base station and no data is successfully obtained by the base station, the base station sets a bit field indicating the data part of the current Msg1 in the random access response to be NACK (identifying data transmission error of Msg1).

Once receiving the NACK indication in the random access response, the terminal continues to transmit Msg3 in the four-step random access process, places the data in Msg1 of the original two-step random access process into Msg3 and transmits Msg3.

b. In a case that a preamble is detected by the base station and no data is successfully obtained by the base station, a first implicit way is used to feed back the detection result.

In a case that a preamble in Msg1 of the two-step random access mechanism is detected by the base station and no data is successfully obtained by the base station, the base station feeds back T-RNTI in the random access response, and the T-RNTI may be determined by the location of the time-frequency resource occupied by Msg1.

In a case that the terminal determines that the T-RNTI received in the random access response is not equivalent to the UE ID stored by the terminal itself, the terminal continues to transmit Msg3 in the four-step random access process, places the data in Msg1 of the original two-step random access process into Msg3 and transmits Msg3.

c. In a case that a preamble is detected by the base station and no data is successfully obtained by the base station, a second implicit way is used to feed back the detection result.

In a case that a preamble in Msg1 of the two-step random access mechanism is detected by the base station and no data is successfully obtained by the base station, the base station provides the feedback in the random access response by using the MAC PDU format applied to the four-step random access mechanism.

In a case that the terminal determines that the MAC PDU format applied to the four-step random access mechanism is received in the random access response, the terminal performs a retransmission based on an uplink grant in the random access response, and the retransmitted content is the data of Msg1. The modulation and encoding mode and the time-frequency location as used are determined according to the uplink grant.

d. In a case that a preamble is detected by the base station and no data is successfully obtained by the base station, no feedback of the detection result is provided.

In a case that a preamble in Msg1 of the two-step random access mechanism is detected by the base station and no data is successfully obtained by the base station, the base station does not feed back any random access response. The terminal itself makes a determination within a time window of random access response, and repeats the random access process (which may be a two-step random access or four-step random access).

If the terminal does not receive a random access response within the corresponding time window of random access response after sending Msg1 including the preamble and data of the two-step random access, there are two processing methods for the terminal to choose: 1) increasing a transmitting power and performing a new four-step random access process; and 2) increasing a transmitting power and performing a two-step random access process again.

e. In a case that a preamble is detected and data is successfully obtained by the base station, the explicit way is used to feed back the detection result.

In a case that a preamble is detected and data is successfully obtained by the base station, the base station sets a bit field indicating the data part of the current Msg1 in the random access response to be ACK (identifying successful data transmission of Msg1).

Once receiving the ACK indication in the random access response, the terminal determines that the two-step random access process is completed.

f. In a case that a preamble is detected and data is successfully obtained by the base station, the second implicit way is used to feed back the detection result.

In a case that a preamble is detected and data is successfully decoded by the base station, the base station analyzes the data part to obtain the UE ID and fills the UE ID into the related field in the random access response, and the base station provides the feedback in the random access response by using the MAC PDU format of the two-step random access mechanism.

In a case that the MAC PDU format of the two-step random access mechanism is received by the terminal in the random access response, and the related field of the terminal identification information in the random access response is equivalent to the UE ID stored by the terminal itself, the terminal determines that the two-step random access process is completed.

According to the embodiments of the present disclosure, the problem in the two-step random access mechanism that the terminal cannot know whether the preamble and the data part in the Msg1 received by the base station are correct is solved, and the integrity of the solution of the two-step random access mechanism is ensured. Moreover, the control plane processing latency is effectively reduced with the two-step random access mechanism, compared with the four-step random access mechanism.

Figure 4:
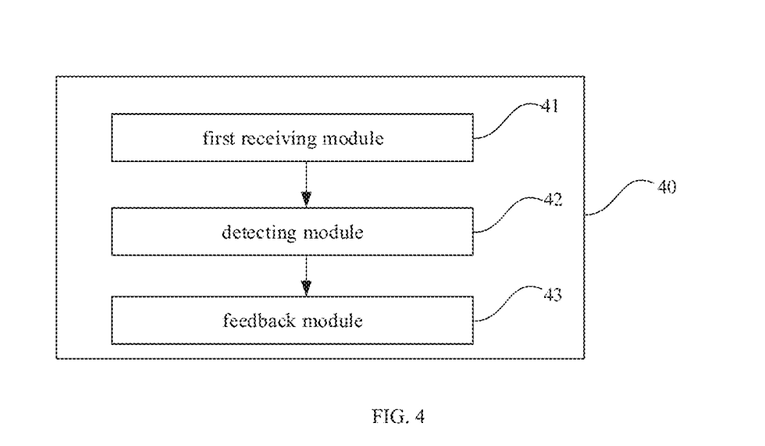
FIG. 4 shows a schematic block diagram of a base station according to some embodiments of the present disclosure.

As shown in FIG. 4, an embodiment of the present disclosure provides a base station 40, which includes:

a first receiving module 41, configured to receive a first message sent by a terminal in performing a random access, wherein the first message includes a preamble field and a data field;

a detecting module 42, configured to detect the preamble field and the data field of the first message to obtain a detection result of whether or not a preamble exists in the first message and/or whether or not data is successfully obtained in the first message; and a feedback module 43, configured to feed back the detection result to the terminal.

Specifically, the detection result includes at least one of a preamble existing in the first message, no preamble existing in the first message, data being successfully obtained in the first message, data not being successfully obtained in the first message, a preamble existing in the first message and data not being successfully obtained in the first message, and a preamble existing in the first message and data being successfully obtained in the first message.

Optionally, in a case that the detection result includes a preamble existing in the first message and data not being successfully obtained in the first message, the feedback module 43 is configured to:

send a random access response carrying data transmission error information to the terminal; or send a random access response carrying radio network temporary identification information of the terminal to the terminal, wherein the radio network temporary identification information of the terminal is not equivalent to identification information of the terminal; or feed back a random access response to the terminal by using a medium access control protocol data unit format of a first random access mechanism; or not send a random access response to the terminal.

Optionally, in a case that the detection result includes a preamble existing in the first message and data being successfully obtained in the first message, the feedback module 43 is configured to:

send a random access response carrying data transmission success information to the terminal; or send a random access response carrying identification information of the terminal to the terminal, wherein the identification information is detected in the data field of the first message; or feed back a random access response to the terminal by using a medium access control protocol data unit format of a second random access mechanism, wherein the identification information of the terminal detected in the data field of the first message is carried in the random access response.

Optionally, in a case that the detection result includes no preamble existing in the first message, the feedback module 43 is configured to:

not send a random access response to the terminal.

It should be noted that the embodiments of the base station correspond to the foregoing method embodiments in a one-on-one correspondence, all the implementations in the foregoing method embodiments are applicable to the embodiments of the base station, and the same technical effects can be achieved.

Figure 5:
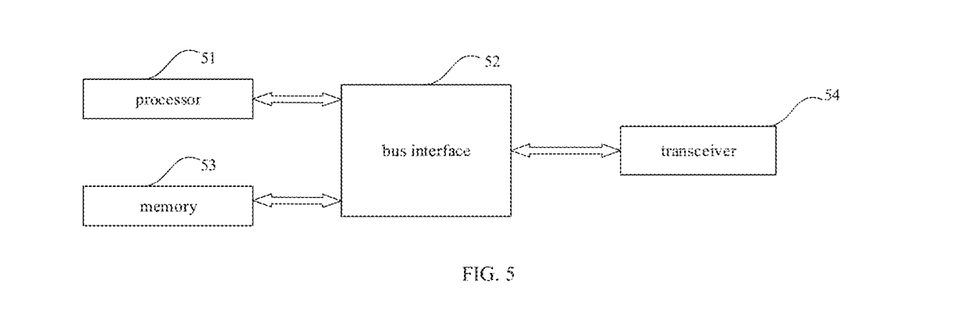
FIG. 5 shows a schematic structural diagram of a base station according to some embodiments of the present disclosure.

As shown in FIG. 5, an embodiment of the present disclosure provides a base station, which includes:

a processor 51, and a memory 53 connected to the processor 51 via a bus interface 52, wherein the memory 53 is configured to store programs and data used by the processor 51 in performing operations. When the programs and data stored in the memory 53 are called and executed by the processor 51, the processor 51 performs the following processes:

receiving through a transceiver 54 a first message sent by a terminal in performing a random access, wherein the first message includes a preamble field and a data field;

detecting the preamble field and the data field of the first message to obtain a detection result of whether or not a preamble exists in the first message and/or whether or data is successfully obtained in the first message; and feeding back the detection result to the terminal through the transceiver 54.

It should be noted that the processor 51 is further configured to implement the functions of any other module of the above base station.

It should be noted that the transceiver 54 is connected to the bus interface 52, and configured to receive the first message and feed back the detection result under the control of the processor 51.

It should be noted that in FIG. 5, the bus architecture may include any number of interconnected buses and bridges, which are specifically linked together by various circuits of one or more processors represented by the processor 51 and memories represented by the memory 53. The bus architecture may also link various other circuits such as peripherals, voltage regulators, and power management circuits. The bus interface provides interfaces. The transceiver 54 may include a plurality of components, including a transmitter and a transceiver, and provide units for communicating with various other devices on a transmission medium. The processor 51 is responsible for managing the bus architecture and normal processing, and the memory 53 can store data used by the processor 51 in performing operations.

It should be understood by those skilled in the art that all or pail of the steps of implementing the above embodiments may be implemented by hardware, or may be implemented by a computer program instructing a related hardware. The computer program includes instructions for executing some or all of the steps in the above method, and the computer program may be stored in a readable storage medium, which may be any form of storage medium.

Figure 6:
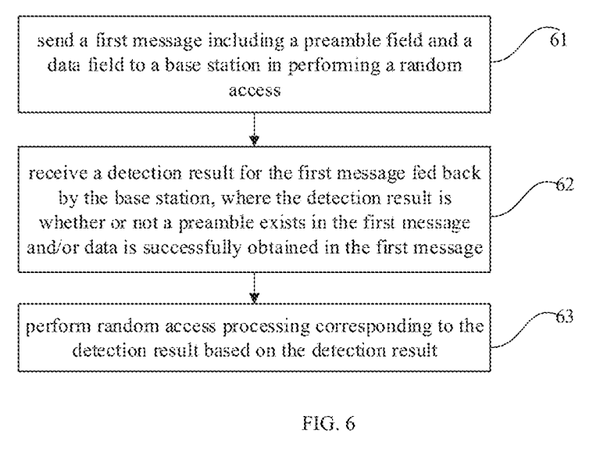
FIG. 6 shows a schematic flowchart of a random access processing method according to some embodiments of the present disclosure.

As shown in FIG. 6, an embodiment of the present disclosure provides a random access processing method, which includes:

step 61: sending a first message including a preamble field and a data field to a base station, during a random access process;

step 62: receiving a detection result for the first message fed back by the base station, wherein the detection result is whether or not a preamble exists in the first message and/or whether or not data is successfully obtained in the first message; and step 63: performing random access processing corresponding to the detection result according to the detection result.

Specifically, the detection result includes at least one of: a preamble existing in the first message, no preamble existing in first message, data being successfully obtained in the first message, data not being successfully obtained in the first message, a preamble existing in the first message and data not being successfully obtained in the first message, and a preamble existing in the first message and data being successfully obtained in the first message.

Optionally, in a case that the detection result includes a preamble existing in the first message and data not being successfully obtained in the first message, the specific implementation of the step 62 is:

receiving a random access response carrying data transmission error information and sent by the base station; or receiving a random access response carrying radio network temporary identification information of the terminal and sent by the base station, wherein the radio network temporary identification information of the terminal is not equivalent to identification information of the terminal.

Accordingly, the specific implementation of the step 63 is: resending the data that is not successfully sent in the first message to the base station.

Optionally, in a case that the detection result includes a preamble existing in the first message and data not being successfully obtained in the first message, the specific implementation of the step 62 is:

receiving a random access response fed back by the base station by using a medium access control protocol data unit format of a first random access mechanism.

Accordingly, the specific implementation of the step 63 is: resending the data that is not successfully sent in the first message based on an uplink grant in the random access response.

Optionally, in a case that the detection result includes a preamble existing in the first message and data being successfully obtained in the first message, the specific implementation of the step 62 is:

receiving a random access response carrying data transmission success information and sent by the base station; or receiving a random access response carrying identification information of the terminal and sent by the base station, wherein the identification information is detected in the data field of the first message; or receiving a random access response fed back by the base station by using a medium access control protocol data unit format of a second random access mechanism, wherein identification information of the terminal detected in the data field of the first message is carried in the random access response.

Accordingly, the specific implementation of the step 63 is: determining that the random access process of the terminal is completed, and performing a subsequent communication process.

Optionally, in a case that the detection result includes no preamble existing in the first message and/or a preamble existing in the first message and data not being successfully obtained in the first message, the specific implementation of the step 62 is:

receiving no random access response fed back by the base station within a predetermined time window of random access response.

Accordingly, the specific implementation of the step 63 is: increasing a transmitting power and performing a random access again until a maximum number of transmission is reached.

All description of the terminal side in the above embodiments described in connection with FIG. 3 is applicable to the embodiments of the random access processing method applied to a terminal, and the same technical effects can be achieved.

Figure 7:
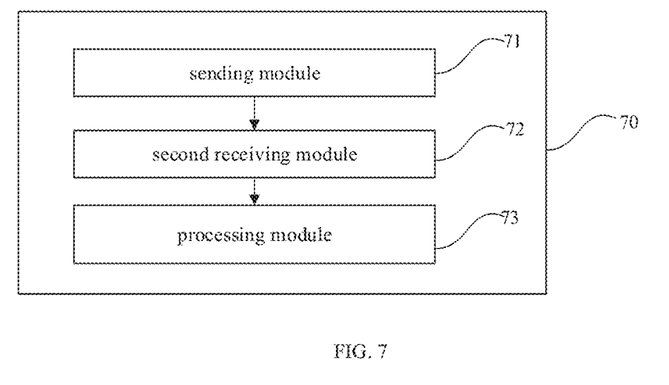
FIG. 7 shows a schematic block diagram showing a terminal according to sonic embodiments of the present disclosure.

As shown in FIG. 7, an embodiment of the present disclosure provides a terminal 70, which includes:

a sending module 71, configured to send a first message including a preamble field and a data field to a base station, during a random access process;

a second receiving module 72, configured to receive a detection result for the first message fed back by the base station, wherein the detection result is whether or not a preamble exists in the first message and/or whether or not data is successfully obtained in the first message; and a processing module 73, configured to perform random access processing corresponding to the detection result according to the detection result.

Specifically, the detection result includes at least one of: a preamble existing in the first message, no preamble existing in the first message, data being successfully obtained in the first message, data not being successfully obtained in the first message, a preamble existing in the first message and data not being successfully obtained in the first message, and a preamble existing in the first message and data being successfully obtained in the first message.

Optionally, in a case that the detection result includes a preamble existing in the first message and data not being successfully obtained in the first message, the second receiving module 72 is configured to:

receive a random access response carrying data transmission error information and sent by the base station.

Optionally, in a case that the detection result includes a preamble existing in the first message and data not being successfully obtained in the first message, the second receiving module 72 is configured to:

receive a random access response carrying radio network temporary identification information of the terminal and sent by the base station, wherein the radio network temporary identification information of the terminal is not equivalent to identification information of the terminal.

Accordingly, the processing module 73 is configured to: resend the data that is not successfully sent in the first message to the base station.

Optionally, in a case that the detection result includes a preamble existing in the first message and data not being successfully obtained in the first message, the second receiving module 72 is configured to:

receive a random access response fed back by the base station by using a medium access control protocol data unit format of a first random access mechanism.

Accordingly, the processing module 73 is configured to: resend the data that is not successfully sent in the first message based on an uplink grant in the random access response.

Optionally, in a case that the detection result includes a preamble existing in the first message and data being successfully obtained in the first message, the second receiving module 72 is configured to:

receive a random access response carrying data transmission success information and sent by the base station; or receive a random access response carrying identification information of the terminal and sent by the base station, wherein the identification information is detected in the data field of the first message; or receive a random access response fed back by the base station by using a medium access control protocol data unit format of a second random access mechanism, wherein identification information of the terminal detected in the data field of the first message is carried in the random access response.

Accordingly, the processing module 73 is configured to: determine that the random access process of the terminal is completed, and perform a subsequent communication process.

Optionally, in a case that the detection result includes no preamble existing in the first message and/or a preamble existing in the first message and data not being successfully obtained in the first message, the second receiving module 72 is configured to:

receive no random access response fed back by the base station within a predetermined time window of random access response.

Accordingly, the processing module 73 is configured to: Increase a transmitting power and perform a random access again until a maximum number of transmission is reached.

It should be noted that the embodiments of the terminal correspond to the foregoing method embodiments in a one-on-one correspondence, all the implementations in the foregoing method embodiments are applicable to the embodiments of the terminal, and the same technical effects can be achieved.

Figure 8:
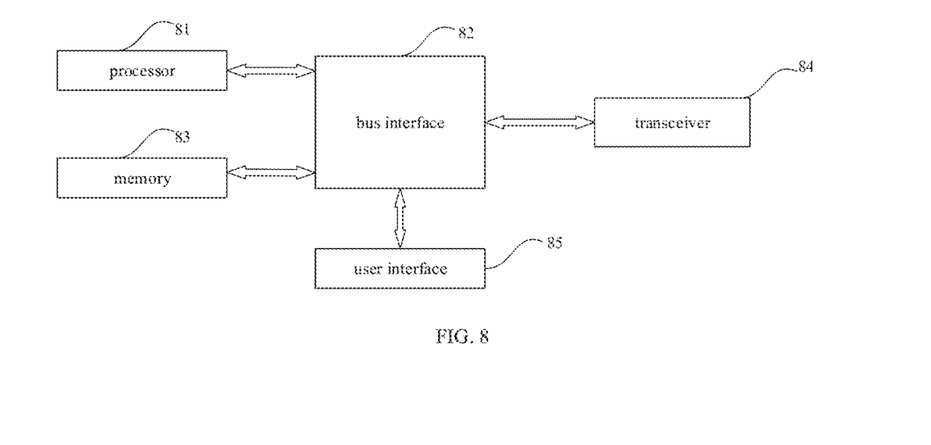
FIG. 8 shows a schematic structural diagram of a terminal according to some embodiments of the present disclosure.

As shown in FIG. 8, an embodiment of the present disclosure provides a terminal, which includes:

a processor 81, and a memory 83 connected to the processor 81 via a bus interface 82, wherein the memory 83 is configured to store programs and data used by the processor 81 in performing operations. When the programs and data stored in the memory 83 are called and executed by the processor 81, the processor 81 performs the following processes:

sending through a transceiver 84 a first message including a preamble field and a data field to a base station, during a random access process;

receiving through the transceiver 84 a detection result for the first message ted back by the base station, wherein the detection result is whether or not a preamble exists in the first message and/or whether or not data is successfully obtained in the first message; and performing random access processing corresponding to the detection result according to the detection result.

The transceiver 84 is connected to the bus interface 82, and configured to send the first message and acquire the detection result under the control of the processor 81.

It should be noted that in FIG. 8, the bus architecture may include any number of interconnected buses and bridges, which are specifically linked together by various circuits of one or more processors represented by the processor 81 and memories represented by the memory 83. The bus architecture may also link various other circuits such as peripherals, voltage regulators, and power management circuits. The bus interface provides interfaces. The transceiver 84 may include a plurality of components, including a transmitter and a transceiver, and provide units for communicating with various other devices on a transmission medium. For different terminals, the user interface 85 may also be an interface capable of externally/internally connecting with the required devices, the required devices including but not being limited to a keypad, a display, a speaker, a microphone, and a joystick. The processor 81 is responsible for managing the bus architecture and normal processing, and the memory 83 can store data used by the processor 81 in performing operations.

It should be understood by those skilled in the art that all or part of the steps of implementing the above embodiments may be implemented by hardware, or may be implemented by a computer program instructing a related hardware. The computer program includes instructions for executing some or all of the steps in the above method, and the computer program may be stored in a readable storage medium, which may be any form of storage medium.

Described above are preferred embodiments of the present disclosure, and it should be noted that those skilled in the art can also make several improvements and modifications without departing from the principles of the present disclosure, which will also fall within the scope of protection of the present disclosure.

What is claimed is:

1. A random access feedback method, comprising:
receiving a first message sent by a terminal in performing a random access, wherein the first message comprises a preamble field and a data field;
detecting the preamble field and the data field of the first message to obtain a detection result of whether or not a preamble exists in the first message and/or whether or not data is successfully obtained in the first message; and
feeding back the detection result to the terminal;
wherein when the detection result comprises a preamble existing in the first message and data not being successfully obtained in the first message, the feeding back the detection result to the terminal comprises:
sending a random access response carrying data transmission error information to the terminal; or
sending a random access response carrying radio network temporary identification information of the terminal to the terminal, wherein the radio network temporary identification information of the terminal is not equivalent to identification information of the terminal; or
feeding back a random access response to the terminal by using a medium access control protocol data unit format of a first random access mechanism; or
not sending a random access response to the terminal.

2. The random access feedback method according to claim 1, wherein the detection result comprises at least one of: a preamble existing in the first message, no preamble existing in the first message, data being successfully obtained in the first message, data not being successfully obtained in the first message, a preamble existing in the first message and data not being successfully obtained in the first message, and a preamble existing in the first message and data being successfully obtained in the first message.

3. The random access feedback method according to claim 2, wherein
wherein when the detection result comprises a preamble existing in the first message and data being successfully obtained in the first message, the feeding back the detection result to the terminal comprises:
sending a random access response carrying data transmission success information to the terminal; or
sending a random access response carrying identification information of the terminal to the terminal, wherein the identification information is detected in the data field of the first message; or
feeding back a random access response to the terminal by using a medium access control protocol data unit format of a second random access mechanism, wherein the identification information of the terminal detected in the data field of the first message is carried in the random access response;
wherein when the detection result comprises no preamble existing in the first message, the feeding back the detection result to the terminal comprises: not sending a random access response to the terminal.

4. A random access processing method, comprising:
sending a first message comprising a preamble field and a data field to a base station, during a random access process;
receiving a detection result for the first message fed back by the base station, wherein the detection result is whether or not a preamble exists in the first message and/or whether or not data is successfully obtained in the first message; and
performing random access processing corresponding to the detection result according to the detection result;
wherein when the detection result comprises a preamble existing in the first message and data not being successfully obtained in the first message, the receiving a detection result for the first message fed back by the base station comprises: receiving a random access response carrying radio network temporary identification information of the terminal and sent by the base station, wherein the radio network temporary identification information of the terminal is not equivalent to identification information of the terminal.

5. The random access processing method according to claim 4, wherein the detection result comprises at least one of: a preamble existing in the first message, no preamble existing in the first message, data being successfully obtained in the first message, data not being successfully obtained in the first message, a preamble existing in the first message and data not being successfully obtained in the first message, and a preamble existing in the first message and data being successfully obtained in the first message.

6. The random access processing method according to claim 5, wherein when the detection result comprises a preamble existing in the first message and data not being successfully obtained in the first message, the step of receiving a detection result for the first message fed back by the base station comprises:
receiving a random access response carrying data transmission error information and sent by the base station.

7. The random access processing method according to claim 6, wherein the performing random access processing corresponding to the detection result comprises:
resending the data that is not successfully sent in the first message to the base station.

8. The random access processing method according to claim 5, wherein when the detection result comprises a preamble existing in the first message and data not being successfully obtained in the first message, the receiving a detection result for the first message fed back by the base station comprises:
receiving a random access response fed back by the base station by using a medium access control protocol data unit format of a first random access mechanism.

9. The random access processing method according to claim 8, wherein the performing random access processing corresponding to the detection result comprises:
resending the data that is not successfully sent in the first message based on an uplink grant in the random access response.

10. The random access processing method according to claim 5, wherein when the detection result comprises a preamble existing in the first message and data being successfully obtained in the first message, the step of receiving a detection result for the first message fed back by the base station comprises:
receiving a random access response carrying data transmission success information and sent by the base station; or
receiving a random access response carrying identification information of the terminal and sent by the base station, wherein the identification information is detected in the data field of the first message; or
receiving a random access response fed back by the base station by using a medium access control protocol data unit format of a second random access mechanism, wherein identification information of the terminal detected in the data field of the first message is carried in the random access response.

11. The random access processing method according to claim 10, wherein the performing random access processing corresponding to the detection result comprises:
determining that the random access process of the terminal is completed, and performing a subsequent communication process.

12. The random access processing method according to claim 5, wherein when the detection result comprises no preamble existing in the first message and/or a preamble existing in the first message and data not being successfully obtained in the first message, the receiving a detection result for the first message fed back by the base station comprises:
receiving no random access response fed back by the base station within a predetermined time window of random access response.

13. The random access processing method according to claim 12, wherein the performing random access processing corresponding to the detection result comprises:
increasing a transmitting power and performing a random access again until a maximum number of transmission is reached.

14. A base station for implementing the random access feedback method according to claim 1, comprising: a processor, a memory, and a transceiver,
wherein the processor is configured to read a program in the memory and perform the following process:
receiving through the transceiver a first message sent by a terminal in performing a random access, wherein the first message comprises a preamble field and a data field;
detecting the preamble field and the data field of the first message to obtain a detection result of whether or not a preamble exists in the first message and/or whether or not data is successfully obtained in the first message; and
feeding back the detection result to the terminal through the transceiver; and
the transceiver is configured to receive and transmit data, and the memory is capable of storing data used by the processor in performing operations.

15. The base station according to claim 14, wherein the detection result comprises at least one of: a preamble existing in the first message, no preamble existing in the first message, data being successfully obtained in the first message, data not being successfully obtained in the first message, a preamble existing in the first message and data not being successfully obtained in the first message, and a preamble existing in the first message and data being successfully obtained in the first message;
wherein when the detection result comprises a preamble existing in the first message and data being successfully obtained in the first message, the processor is further configured to:
send a random access response carrying data transmission success information to the terminal; or
send a random access response carrying identification information of the terminal to the terminal, wherein the identification information is detected in the data field of the first message; or
feed back a random access response to the terminal by using a medium access control protocol data unit format of a second random access mechanism, wherein the identification information of the terminal detected in the data field of the first message is carried in the random access response;
wherein when the detection result comprises no preamble existing in the first message, the processor is further configured to: not send a random access response to the terminal.

16. A terminal, comprising: a processor, a memory, and a transceiver,
wherein the processor is configured to read a program in the memory and perform the following process:
sending through the transceiver a first message comprising a preamble field and a data field to a base station, during a random access process;
receiving through the transceiver a detection result for the first message fed back by the base station, wherein the detection result is whether or not a preamble exists in the first message and/or whether or not data is successfully obtained in the first message; and performing random access processing corresponding to the detection result according to the detection result; and the transceiver is configured to receive and transmit data, and the memory is capable of storing data used by the processor in performing operations;

wherein when the detection result comprises a preamble existing in the first message and data not being successfully obtained in the first message, the processor is further configured to:

send a random access response carrying data transmission error information to the terminal; or send a random access response carrying radio network temporary identification information of the terminal to the terminal, wherein the radio network temporary identification information of the terminal is not equivalent to identification information of the terminal; or feed back a random access response to the terminal by using a medium access control protocol data unit format of a first random access mechanism; or not send a random access response to the terminal.

17. The terminal according to claim 16, wherein the detection result comprises at least one of: a preamble existing in the first message, no preamble existing in the first message, data being successfully obtained in the first message, data not being successfully obtained in the first message, a preamble existing in the first message and data not being successfully obtained in the first message, and a preamble existing in the first message and data being successfully obtained in the first message.

18. The terminal according to claim 17, wherein when the detection result comprises a preamble existing in the first message and data not being successfully obtained in the first message, the processor is further configured to: receive a random access response carrying data transmission error information and sent by the base station;

when the detection result comprises a preamble existing in the first message and data not being successfully obtained in the first message, the processor is further configured to: receive a random access response carrying radio network temporary identification information of the terminal and sent by the base station, wherein the radio network temporary identification information of the terminal is not equivalent to identification information of the terminal;

wherein the processor is further configured to: resend the data that is not successfully sent in the first message to the base station.

19. The terminal according to claim 17, wherein when the detection result comprises a preamble existing in the first message and data not being successfully obtained in the first message, the processor is further configured to: receive a random access response fed back by the base station by using a medium access control protocol data unit format of a first random access mechanism;

wherein the processor is further configured to: resend the data that is not successfully sent in the first message based on an uplink grant in the random access response.

20. The terminal according to claim 17, wherein when the detection result comprises a preamble existing in the first message and data being successfully obtained in the first message, the processor is further configured to:

receive a random access response carrying data transmission success information and sent by the base station; or receive a random access response carrying identification information of the terminal and sent by the base station, wherein the identification information is detected in the data field of the first message; or receive a random access response fed back by the base station by using a medium access control protocol data unit format of a second random access mechanism, wherein identification information of the terminal detected in the data field of the first message is carried in the random access response;

wherein the processor is further configured to: determine that the random access process of the terminal is completed, and perform a subsequent communication process;

wherein when the detection result comprises no preamble existing in the first message and/or a preamble existing in the first message and data not being successfully obtained in the first message, the processor is further configured to: receive no random access response fed back by the base station within a predetermined time window of random access response;

wherein the processor is further configured to: increase a transmitting power and perform a random access again until a maximum number of transmission is reached.

* * * * *